United States Patent
Huang et al.

(10) Patent No.: US 9,290,610 B2
(45) Date of Patent: *Mar. 22, 2016

(54) METHODS OF PRODUCING POLYANTHRACENE AND USES THEREOF

(71) Applicant: Tongji University, Shanghai (CN)

(72) Inventors: Mei-rong Huang, Shanghai (CN); Xin-gui Li, Shanghai (CN); Shao-Jun Huang, Shanghai (CN)

(73) Assignee: Tongji University, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/255,715

(22) Filed: Apr. 17, 2014

(65) Prior Publication Data

US 2014/0221604 A1    Aug. 7, 2014

Related U.S. Application Data

(62) Division of application No. 13/133,143, filed as application No. PCT/CN2010/073532 on Jun. 4, 2010, now Pat. No. 8,735,537.

(51) Int. Cl.
*C08G 61/10* (2006.01)
*H01G 9/022* (2006.01)
*H01G 11/56* (2013.01)
*H01M 10/0565* (2010.01)
(Continued)

(52) U.S. Cl.
CPC .............. *C08G 61/10* (2013.01); *H01G 9/038* (2013.01); *H01G 11/56* (2013.01); *H01M 10/0565* (2013.01); *C08G 2261/314* (2013.01); *C08G 2261/43* (2013.01); *C08G 2261/70* (2013.01); *H01M 2300/0082* (2013.01); *Y02E 60/13* (2013.01)

(58) Field of Classification Search
CPC ....................................................... C08G 61/10
USPC ......... 528/396, 482, 485, 486, 488, 492, 497, 528/499, 502
See application file for complete search history.

(56) References Cited

U.S. PATENT DOCUMENTS 3,431,221 A   3/1969 Hoess
4,022,717 A   5/1977 Clement
(Continued)

FOREIGN PATENT DOCUMENTS

CA   887080    11/1971
EP   1288276    3/2003
GB   1128896   10/1968
(Continued)

OTHER PUBLICATIONS

Extended European Search Report dated Aug. 4, 2014 for European Patent Application No. 10852370.5.
(Continued)

*Primary Examiner* — Duc Truong
(74) *Attorney, Agent, or Firm* — Knobbe, Martens, Olson & Bear, LLP

(57) ABSTRACT

The present application provides methods of producing polyanthracene including polymerization of anthracene monomers in the presence of oxidants and reaction solvents. The present application further provides polyanthracene produced by methods described herein that has higher solubility in organic solvents and better thermal stability and ablation resistance.

19 Claims, 3 Drawing Sheets

(51) Int. Cl.
*C08G 61/02* (2006.01)
*C08G 61/00* (2006.01)

(56) References Cited

U.S. PATENT DOCUMENTS

| 8,735,537 | B2 * | 5/2014 | Huang et al. ............. 528/396 |
| 2013/0005942 | A1 | 1/2013 | Huang et al. |

FOREIGN PATENT DOCUMENTS

| JP | 63-010621 A | 1/1988 |
| JP | 63-020326 A | 1/1988 |
| JP | 63020326 | 1/1988 |
| JP | 63-099225 A | 4/1988 |
| JP | 63135418 A | 6/1988 |
| JP | 63-175493 A | 7/1988 |
| JP | 64-001722 A | 1/1989 |
| JP | 2004-269431 A | 9/2004 |
| JP | 2009-511732 T | 3/2009 |
| WO | WO 2008/004751 A1 | 1/2008 |

OTHER PUBLICATIONS

Sato et al. Manufacture of polyanthracenes for semiconductor materials:, Sep. 17, 1988, Chemical Abstracts Services, Columbus, Ohio. Retrieved from STN.Database accession No. 1988:503165.

Muller et al: "Polyarylenes and Poly(Arylenevinylene)s, 134. Osynthesis of Soluble Poly (2,6-di-tert-butyl-9, 10-anthrylene) via reductive coupling of quinones with litioanthrylenes", Macromolecular Rapid Communications, Wiley-VCH Verlag GmbH & Co., KGAA, vol. 15, No. 1, Jan. 1, 1994, pp. 45-53.

Kumar, A., and Gupta, R. K., "Fundamentals of Polymer Engineering," CRC Press, Second Edition Revised and Expanded, Chapter 8, section 7, pp. 364-368 (Jan. 21, 2003).

Álvarez et al. "Mesophase from Anthracene Oil-Based Pitches." Energy & Fuels, 2008, 22:4146-4150.

ASTM Standard E 285-80, "Standard Test Method for Oxyacetylene Ablation Testing of Thermal Insulation Materials," ASTM International, West Conshohocken, PA, 2002, p. 6.

Ebbson, T.W. "Carbon Nanotubes," Physics Today, Jun. 1996, pp. 26-32.

Fan, et al. "Electrochemical polymerization of anthracene in boron trifluoride diethyl etherate." Journal of Electroanalytical Chemistry, 2005, 575: 287-292.

Fauteux, D. et al., "Lithium polymer electrolyte rechargeable battery," Electrochimica Acta, vol. 40, Issues 13-14, Oct. 1985, pp. 2185-2190.

Fernández et al. "Catalytic polymerization of anthracene oil with aluminium trichloride." 1999, 37:1247-1255.

Hara et al. "Electrochemical polymerization of naphthalene using a composite electrolyte of aluminum chloride and copper (I) chloride." Chemistry letters, 1990, (2):269-272.

Huang et al. "Electrochemical polymerization of naphthalene in the electrolyte of boron trifluoride diethyl etherate containing trifluoroacetic acid and polyethylene glycol oligomer." Journal of electroanalytical Chemistry, 2003, 556:159-165.

Katzman et al. "Polyarylacetylene-Matrix Composites for Solid Rocket Motor Components." Journal of Advanced Materials, 1995, 4:21.

Kovacic et al. "Dehydro Coupling of Aromatic Nuclei by Catalyst-Oxidant Systems: Poly (*p*-phenylene)." Chemical Reviews, 1987, 87(2): 357-379.

Menczel, J. and Prime, B., "Thermal Analysis of Polymers, Fundamentals and Applications," published by John Wiley & Sons, Inc., Hoboken, New Jersey, Chapter 3, 2009, pp. 241-311.

Najim, T. et al., "Thermal and Ablative Properties of Ipns and Composites of High Ortho Resole Resin and Difurfurylidene Acetone," Leonardo Electronic Journal of Practices and Technologies, Issue 13, Jul.-Dec. 2008, pp. 34-46.

Nielsen, M.W.F. and Malucha, S., "Characterization of Polydisperse Synthetic Polymers by Size-exclusion Chromatography/Matrix-assisted Laser Desorption/Ionization Time-of-flight Mass Spectrometry," Rapid Communications in Mass Spectrometry, vol. 11, Issue 11, 1997, pp. 1194-1204.

Ohsawa et al. "Preparation and properties of films prepared by using composite electrolytes." Polymer Communications, 1987, 28(5): 140-142.

Okuzaki et al. "Electrical and mechanical properties of poly(*p*-phenylene) files prepared by electrochemical polymerization." Synthetic Metals, 2005, 153(1-3): 161-164.

Satoh, et al. "The Electrochemical Polymerization of Anthracene." Chemical Communications, 1986, (12): 979-980.

Shumov et al., Neft Gasovickh Produktov, 1971, pp. 142-143.

Stasiak, M. et al, "Polymer Fibers as Carriers for Homogeneous Catalysts," Chemistry—A European Journal, vol. 13, Issue 21, 2007, pp. 6150-6156.

Strong, A.B., "Fundamentals of composites manufacturing: materials, methods and applications," published by SME, Edition 2, 2008, pp. 133-136.

Tasch et al. "Red-Orange Electroluminescence with New Soluble and Air-Stable Poly(naphthalene-vinylene)s." Advanced Materials, 1995, 7(11): 903-906.

International Search Report and Written Opinion dated Mar. 17, 2011 for PCT Application No. PCT/CN2010/073532, filed Jun. 4, 2010.

\* cited by examiner

US 9,290,610 B2

METHODS OF PRODUCING POLYANTHRACENE AND USES THEREOF

CROSS-REFERENCE TO RELATED APPLICATIONS

The present application is a divisional filing under 35 U.S.C. §121 of U.S. patent application Ser. No. 13/133,143, filed Jun. 6, 2011, now U.S. Pat. No. 8,735,537, which is the U.S. National Phase under 35 U.S.C. §371 of International Application No. PCT/CN2010/073532 entitled METHODS OF PRODUCING POLYANTHRACENE AND USES THEREOF, filed Jun. 4, 2010, designating the U.S. All of the aforementioned priority applications are herein expressly incorporated by reference in their entirety.

BACKGROUND

Polyanthracene is a Π-conjugated polymer of anthracene monomers. It has attracted lots of attention in fundamental physics studies and potential applications in optoelectronics and microelectronics. Polyanthracene is usually prepared through two methods: electrochemical synthesis and chemical polymerization. However, the two methods have shortcomings in practical application. For example, the electrochemical synthesis method requires complicated reaction equipment, and the polyanthracene yield is low due to size limitations of the electrode area. The chemical polymerization method involves dangerous and potentially violent reactions and the production yield is also low.

Furthermore, the polyanthracene obtained from the two methods mentioned above have some limitations in physical characteristics. First, the polyanthracene has low solubility in common organic solvents such as tetrahydrofuran and chloroform. Second, the polyanthracene typically has a low degree of polymerization, and thus shows low thermal stability and low char yield.

In one study using an electrochemical method, anthracene was polymerized using boron trifluoride diethyl etherate as an electrolyte. According to the study, polyanthracene with 4-17 repeating anthracene units was obtained, its conductivity was measured as around 0.1 S/cm, and the product yield was calculated to be approximately 25% (B. Fan, et al, "Electrochemical polymerization of anthracene in boron trifluoride diethyl etherate", Journal of Electroanalytical Chemistry, 575:287-292 (2005)).

SUMMARY

In one aspect, the present disclosure provides a method of producing polyanthracene including polymerizing anthracene monomers in the presence of an oxidant and a reaction solvent.

In another aspect, the present disclosure provides a method of producing polyanthracene including polymerizing anthracene monomers in the presence of an oxidant, a reaction solvent and water.

In another aspect, the present disclosure provides a polyanthracene produced by a method including polymerizing anthracene monomers in the presence of an oxidant and a reaction solvent.

In another aspect, the present disclosure provides a polyanthracene containing 18 or more units of anthracene monomers.

In another aspect, the present disclosure provides a polyanthracene which is soluble in organic solvent.

In another aspect, the present disclosure provides a polyanthracene useful for making thermal stable materials or ablation resistant materials.

In another aspect, the present disclosure provides a composition including a polyanthracene produced by a method described herein.

In another aspect, the present disclosure provides a composition including a polyanthracene in which 5% to 80% of the polyanthracene by weight contains 18 or more units of anthracene monomers.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
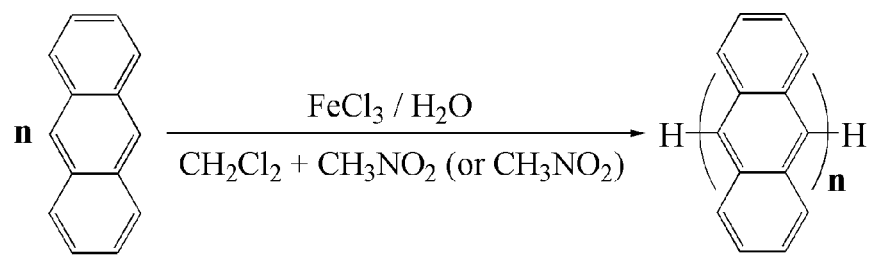
FIG. 1 shows an illustrative polymerization reaction for producing polyanthracene.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

In one aspect, the present disclosure provides a method of producing polyanthracene, including polymerizing anthracene monomers in the presence of an oxidant and a reaction solvent.

The term "oxidant" refers to one or more substances that can gain electrons in a reduction-oxidation reaction. In an illustrative embodiment, the oxidant is a Lewis acid or a combination of more than one Lewis acid. In another illustrative embodiment, the oxidant includes, but is not limited to one or more of: $FeCl_3$, $FeBr_3$, $AlCl_3$, $AlBr_3$, $AlI_3$, $AlRCl_2$, $AlR_2Cl$, $AlR_3$, $CuCl_2$, $CuBr_2$, $MoCl_5$, $SnCl_4$, $SnBr_4$, $SnI_4$, $MgCl_2$, $MgBr_2$, $MgI_2$, $CaCl_2$, $CaBr_2$, $CaI_2$, $ZnCl_2$, $ZnBr_2$, $ZnI_2$, $BF_3$, $TiCl_4$, $TiBr_4$, $SbCl_5$, and any combination thereof. In another illustrative embodiment, the oxidant is $FeCl_3$.

The term "reaction solvent" is an organic solvent that may be used in the reaction to promote and facilitate the oxidation reaction. The reaction solvent may contain one or more organic chemical compounds in liquid form under the reaction temperature, such as but not limited to, nitroalkanes, aromatic nitro compounds, hydrocarbons, halogenated hydrocarbons, nitriles and any combination thereof. Hydrocarbons are organic compounds consisting of entirely hydrogen and carbon. Illustrative examples include, but are not limited to, hexane, benzene, and isooctane. Nitroalkanes are saturated hydrocarbon derivatives having at least one nitro group (—NO$_2$). Illustrative examples include, but are not limited to, nitromethane, nitroethane, 1-nitropropane, and 2-nitropropane. Aromatic nitro compounds are organic compounds having at least one benzene ring and at least one nitro group attached to the benzene ring. Illustrative examples include, but are not limited to, nitrobenzene, and dinitrobenzene. Halogenated hydrocarbons are hydrocarbon derivatives having at least one halogen. Illustrative examples include, but are not limited to, dichlorobenzene, bromoethane, chloroform, CH3-CHCl$_2$, CH$_3$—CHCl$_2$, CH$_2$Cl—CH$_2$Cl, CH$_2$Cl$_2$, and bromopentane. Nitriles are organic compounds having at least one —C≡N functional group. Illustrative examples include, but are not limited to, acetonitrile, propionitrile and butyronitrile. In another illustrative embodiment, the reaction solvent includes, but is not limited to one or more of: nitromethane (CH3NO2), nitroethane (CH3CH2NO2), nitrobenzene, dinitrobenzene, hexane benzene, pentane, isooctane, cyclohexane, dichloromethane, chloroform, dichloroethane, dichlorobenzene, bromoethane, dibromoethane, bromobenzene, dibromobenzene, bromopentane, carbon tetrachloride, acetonitrile, propionitrile, butyronitrile, and any combination thereof.

The reaction solvent should be able to at least partially (or completely) dissolve anthracene and/or the oxidant. In certain embodiments, the reaction solvent can at least partially (or completely) dissolve the anthracene monomer. In an illustrative embodiment, the anthracene monomer dissolved in the reaction solvent is at least 5%, at least 10%, at least 20%, at least 30%, at least 40%, at least 50%, at least 60%, at least 70%, at least 80%, or at least 90% of the total weight of the anthracene monomer present in the reaction solvent. In an illustrative embodiment, the anthracene monomer dissolved in the reaction solvent is between 5%-100%, between 5%-90%, between 5%-80%, between 5%-70%, between 5%-60%, between 5%-50%, between 5%-40%, between 5%-30%, between 5%-20%, between 5%-10%, between 10%-100%, between 10%-90%, between 10%-80%, between 10%-70%, between 10%-60%, between 10%-50%, between 10%-40%, between 10%-30%, or between 10%-20% of the total weight of the anthracene monomer present in the reaction solvent.

In certain embodiments, the reaction solvent can at least partially (or completely) dissolve the oxidant. In an illustrative embodiment, the oxidant dissolved in the reaction solvent is at least 5%, at least 10%, at least 20%, at least 30%, at least 40%, at least 50%, at least 60%, at least 70%, at least 80%, or at least 90% of the total weight of the oxidant present in the reaction solvent. In an illustrative embodiment, the oxidant dissolved in the reaction solvent is between 5%-100%, between 5%-90%, between 5%-80%, between 5%-70%, between 5%-60%, between 5%-50%, between 5%-40%, between 5%-30%, between 5%-20%, between 5%-10%, between 10%-100%, between 10%-90%, between 10%-80%, between 10%-70%, between 10%-60%, between 10%-50%, between 10%-40%, between 10%-30%, or between 10%-20% of the total weight of the oxidant present in the reaction solvent.

In certain embodiments, the reaction solvent consists of one organic solvent that at least partially (or completely) dissolves both the anthracene monomer and the oxidant. Illustrative examples of such reaction solvents include, but are not limited to nitroalkanes such as but not limited to nitromethane and nitroethane, hydrocarbons, halogenated hydrocarbons, and nitriles. In certain embodiments, the reaction solvent contains a mixture of different organic solvents that can at least partially (or completely) dissolve both the anthracene monomer and the oxidant. Illustrative examples of such reaction solvents include but are not limited to, halogenated hydrocarbon/nitroalkane such as dichloromethane/nitromethane, dichloroethane/nitromethane, dichloromethane/nitroethane, dichloroethane/nitroethane; halogenated hydrocarbon/aromatic nitro compound such as dichloromethane/nitrobenzene, and dichloroethane/nitrobenzene; hydrocarbon/nitroalkane such as benzene/nitromethane, and benzene/nitroethane; hydrocarbon/aromatic nitro compound such as n-hexane/nitrobenzene, and benzene/nitrobenzene; and nitriles/nitroalkane such as acetonitrile/nitromethane.

In certain embodiments, the reaction solvent may contain a first organic solvent that can at least partially (or completely) dissolve the anthracene monomer, and a second organic solvent that can at least partially (or completely) dissolve the oxidant, and the two solvents are mutually miscible. Illustrative examples include but are not limited to, dichloromethane/nitromethane, dichloroethane/nitromethane, and benzene/nitromethane. In certain embodiments, the reaction solvent may contain a first organic solvent that can at least partially (or completely) dissolve the anthracene monomer, and a second organic solvent that can at least partially (or completely) dissolve the oxidant, and the two reaction solvents cannot dissolve into each other and thus would separate into two phases when mixed together. Illustrative examples include but are not limited to, n-hexane/nitromethane, cyclohexane/nitromethane, i-pentane/nitromethane, n-pentane/nitromethane, and isooctane/nitromethane, etc. Furthermore, the first organic solvent and the second organic solvent may each consist of one or more organic compounds.

In an illustrative embodiment, the present disclosure provides a method of producing polyanthracene, including polymerizing anthracene monomers in the presence of an oxidant and a reaction solvent, in which the molar ratio of the oxidant to the anthracene monomers is in the range from 1:1 to 9:1. In another illustrative embodiment, the molar ratio of the oxidant to the anthracene monomers is in the range from 1:1 to 8:1. In another illustrative embodiment, the molar ratio of the oxidant to the anthracene monomers is in the range from 1:1 to 7:1. In another illustrative embodiment, the molar ratio of the oxidant to the anthracene monomers is in the range from 1:1 to 6:1. In another illustrative embodiment, the molar ratio of the oxidant to the anthracene monomers is in the range from 1:1 to 5:1. In another illustrative embodiment, the molar ratio of the oxidant to the anthracene monomers is in the range from 1:1 to 4:1. In another illustrative embodiment, the molar ratio of the oxidant to the anthracene monomers is in the range from 1:1 to 3:1. In another illustrative embodiment, the molar ratio of the oxidant to the anthracene monomers is in the range from 1:1 to 2:1.

In an illustrative embodiment, the present disclosure provides a method of producing polyanthracene, including polymerizing anthracene monomers in the presence of an oxidant and a reaction solvent, in which the polymerization is conducted at the reaction temperature ranging from 20° C. to 100° C. In another illustrative embodiment, the reaction temperature is from 20° C. to 80° C. In another illustrative embodiment, the reaction temperature is from 20° C. to 60° C. In another illustrative embodiment, the reaction temperature is from 20° C. to 50° C. In another illustrative embodiment, the reaction temperature is from 20° C. to 45° C. In another illustrative embodiment, the reaction temperature is from 20° C. to 40° C. In another illustrative embodiment, the reaction temperature is from 20° C. to 35° C. In another illustrative embodiment, the reaction temperature is from 20° C. to 30° C. In another illustrative embodiment, the reaction temperature is at or above about 20° C., 21° C., 22° C., 23° C., 24° C., or 25° C., but not higher than about 100° C. The reaction temperature can be monitored and/or measured using a thermometer appropriately submerged in the reaction mixture or in the bath surrounding the reaction mixture.

In an illustrative embodiment, the present disclosure provides a method of producing polyanthracene, including polymerizing anthracene monomers in the presence of an oxidant and a reaction solvent, in which the polymerization is conducted for a reaction time of 1 to 24 hours. In another illustrative embodiment, the reaction time is 2 to 12 hours. In another illustrative embodiment, the reaction time is 6 to 8 hours. In another illustrative embodiment, the reaction time is for up to 4 hours, 6 hours, 8 hours, 10 hours, 12 hours, 14 hours, 16 hours, 18 hours, 20 hours, 22 hours or 24 hours. In another illustrative embodiment, the reaction time is at least 1 hour, 2 hours, 3 hours, 4 hours, or 5 hours.

In an illustrative embodiment, the present disclosure provides a method of producing polyanthracene, including polymerizing anthracene monomers in the presence of an oxidant, a reaction solvent, and water. In another illustrative embodiment, the water constitutes at least 1%, 5%, 10%, 20%, 30%, 40%, or 50% in volume of the polymerization reaction mixture. In another illustrative embodiment, the water constitutes about 1% to 5%, about 5% to 10%, about 10% to 15%, about 15% to 20%, about 20% to 25%, about 25% to 30%, about 30% to 35%, about 35% to 40%, about 40% to 45%, or about 45% to 50% in volume of the polymerization reaction mixture. In another illustrative embodiment, the water constitutes about 1% to 10%, about 5% to 20%, about 10% to 30%, about 20% to 40%, about 30% to 50%, about 40% to 50%, about 1% to 50%, about 5% to 40%, about 10% to 40%, or about 20% to 30% in volume of the polymerization reaction mixture.

In another aspect, the present disclosure provides a polyanthracene produced by a method described herein. In an illustrative embodiment, the oxidant is a Lewis acid or a combination of more than one Lewis acid. In another illustrative embodiment, the oxidant includes, but is not limited to one or more of: $FeCl_3$, $FeBr_3$, $AlCl_3$, $AlBr_3$, $AlI_3$, $AlRCl_2$, $AlR_2Cl$, $AlR_3$, $CuCl_2$, $CuBr_2$, $MoCl_5$, $SnCl_4$, $SnBr_4$, $SnI_4$, $MgCl_2$, $MgBr_2$, $MgI_2$, $CaCl_2$, $CaBr_2$, $CaI_2$, $ZnCl_2$, $ZnBr_2$, $ZnI_2$, $BF_3$, $TiCl_4$, $TiBr_4$, $SbCl_5$, and any combination thereof. In another illustrative embodiment, the oxidant is $FeCl_3$. In another illustrative embodiment, the reaction solvent is nitroalkanes, aromatic nitro compounds, hydrocarbons, halogenated hydrocarbons, and/or nitriles. In another illustrative embodiment, the reaction solvent includes, but is not limited to one or more of: nitromethane, nitroethane, nitrobenzene, dinitrobenzene, hexane, benzene, pentane, isooctane, cyclohexane, dichloromethane, chloroform, dichloroethane, dichlorobenzene, bromoethane, dibromoethane, bromobenzene, dibromobenzene, bromopentane, carbon tetrachloride, acetonitrile, propionitrile, butyronitrile, and any combination thereof.

In an illustrative embodiment, the present disclosure provides a polyanthracene produced by a method including polymerizing anthracene monomers in the presence of an oxidant and a reaction solvent, in which the molar ratio of the oxidant to the anthracene monomers is in the range from 1:1 to 9:1. In another illustrative embodiment, the molar ratio of the oxidant to the anthracene monomers is in the range from 1:1 to 8:1. In another illustrative embodiment, the molar ratio of the oxidant to the anthracene monomers is in the range from 1:1 to 7:1. In another illustrative embodiment, the molar ratio of the oxidant to the anthracene monomers is in the range from 1:1 to 6:1. In another illustrative embodiment, the molar ratio of the oxidant to the anthracene monomers is in the range from 1:1 to 5:1. In another illustrative embodiment, the molar ratio of the oxidant to the anthracene monomers is in the range from 1:1 to 4:1. In another illustrative embodiment, the molar ratio of the oxidant to the anthracene monomers is in the range from 1:1 to 3:1. In another illustrative embodiment, the molar ratio of the oxidant to the anthracene monomers is in the range from 1:1 to 2:1.

In an illustrative embodiment, the present disclosure provides a polyanthracene produced by a method including polymerizing anthracene monomers in the presence of an oxidant and a reaction solvent, in which the polymerization is conducted at the reaction temperature ranging from 20° C. to 100° C. In another illustrative embodiment, the reaction temperature ranges from 20° C. to 80° C. In another illustrative embodiment, the reaction temperature ranges from 20° C. to 60° C.

In another illustrative embodiment, the reaction temperature ranges from 20° C. to 50° C. In another illustrative embodiment, the reaction temperature ranges from 20° C. to 45° C. In another illustrative embodiment, the reaction temperature ranges from 20° C. to 40° C. In another illustrative embodiment, the reaction temperature ranges from 20° C. to 35° C. In another illustrative embodiment, the reaction temperature ranges from 20° C. to 30° C. In another illustrative embodiment, the reaction temperature is at or above about 20° C., 21° C., 22° C., 23° C., 24° C., or 25° C., but not higher than about 100° C.

In an illustrative embodiment, the present disclosure provides a polyanthracene produced by a method including polymerizing anthracene monomers in the presence of an oxidant and a reaction solvent, in which the polymerization is conducted for a reaction time ranging from 1 to 24 hours. In another illustrative embodiment, the reaction time ranges from 2 to 12 hours. In another illustrative embodiment, the reaction time ranges from 6 to 8 hours. In another illustrative embodiment, the reaction time is for up to 4 hours, 6 hours, 8 hours, 10 hours, 12 hours, 14 hours, 16 hours, 18 hours, 20 hours, 22 hours or 24 hours. In another illustrative embodiment, the reaction time is at least 1 hour, 2 hours, 3 hours, 4 hours, or 5 hours.

In an illustrative embodiment, the present disclosure provides a polyanthracene produced by a method including polymerizing anthracene monomers in the presence of an oxidant, a reaction solvent, and water. In another illustrative embodiment, the polymerization reaction mixture contains at least 1%, 5%, 10%, 20%, or 50% water by volume.

In an illustrative embodiment, the present disclosure provides a polyanthracene produced by a method described herein, in which the polyanthracene contains 18 or more units of anthracene monomers. In another illustrative embodiment, the present disclosure provides a polyanthracene which contains 18 or more units of anthracene monomers. In another illustrative embodiment, the polyanthracene of the present disclosure contains 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 or more units of anthracene monomers. In another illustrative embodiment, the polyanthracene contains 18 to 25 units of anthracene monomers. In another illustrative embodiment, about 5% to 80% of the polyanthracene by weight contains 18 or more units of anthracene monomers. In another illustrative embodiment, about 10% to 50% of the polyanthracene by weight contains 18 or more units of anthracene monomers. In another illustrative embodiment, about 20% to 30% of the polyanthracene by weight contains 18 or more units of anthracene monomers. The number of anthracene monomer units in a polyanthracene can be determined by matrix-assisted laser desorption/ionization time-of-flight mass spectrometer (MALDI-TOF-MS) (W. Schrepp, H. Pasch, "Maldi-T of Mass Spectrometry of Synthetic Polymers" (Springer Laboratory) (2003), Berlin: Springer-Verla; Nielen, Michel W. F., "Characterization of polydisperse synthetic polymers by size-exclusion chromatography/matrix-assisted laser desorption/ionization time-of-flight mass spectrometry", *Rapid Communications in Mass Spectrometry* 11: 1194 (1997).).

In an illustrative embodiment, the present disclosure provides a composition including a polyanthracene, in which the polyanthracene contains 18 or more units of anthracene monomers. In another illustrative embodiment, the present disclosure provides a composition including a polyanthracene, in which 5% to 80% of the polyanthracene by weight contains 18 or more units of anthracene monomers.

In an illustrative embodiment, the present disclosure provides a polyanthracene produced by a method described herein, in which about 5% to 95% of the polyanthracene has a weight average molecular weight of about 500 to 10,000.

In another illustrative embodiment, the present disclosure provides a polyanthracene, in which about 5% to 95% of the polyanthracene has a weight average molecular weight of about 500 to 10,000. In another illustrative embodiment, the polyanthracene of the present disclosure has a molecular weight of about 500 to 9000, about 500 to 8,000, about 500 to 7,000, about 500 to 6,500, about 500 to 6,000, about 500 to 5,000, about 500 to 4,500, about 500 to 4,000, about 500 to 3,500, about 500 to 3,000, about 500 to 2,500, about 500 to 2,000, about 500 to 1,500, about 500 to 1,000, about 1,000 to 10,000, about 2,000 to 10,000, about 3,000 to 10,000, about 4,000 to 10,000, about 5,000 to 10,000, about 6,000 to 10,000, about 7,000 to 10,000, about 8,000 to 10,000, or about 9,000 to 10,000. The molecular weight of polyanthracene can be determined by gel permeation chromatography using polystyrene standards (A. Kumar et al, "Fundamentals of Polymer Engineering", published by CRC Press, Edition 2, Chapter 8 section 7, p 364-368 (2003)).

In an illustrative embodiment, the present disclosure provides a polyanthracene produced by a method described herein, in which the polyanthracene has a thermal decomposition temperature between about 300° C. and 1000° C. In another illustrative embodiment, the present disclosure provides a polyanthracene having a thermal decomposition temperature between about 300° C. and 1000° C. In another illustrative embodiment, the polyanthracene of the present disclosure has a thermal decomposition temperature between about 300° C. and 900° C., between about 400° C. and 900° C., between about 500° C. and 900° C., between about 600° C. and 900° C., between about 700° C. and 900° C., between about 800° C. and 900° C., between about 300° C. and 800° C., between about 300° C. and 700° C., between about 300° C. and 600° C., between about 300° C. and 500° C., or between about 300° C. and 400° C. in the presence of nitrogen. The term "thermal decomposition temperature" refers to the temperature at which the weight loss of polyanthracene reaches the maximum speed. The thermal decomposition temperature can be determined by the thermogravimetric analysis (TGA) (J. Menczel, B. Prime, "Thermal Analysis of Polymers, Fundamentals and Applications", published by John Wiley & Sons, Inc., Hoboken, N.J., Chapter 3, p. 241-311 (2009)).

In an illustrative embodiment, the present disclosure provides a polyanthracene produced by a method described herein, in which the electrical conductivity of the polyanthracene is about $10^{-9}$ to $10^{-11}$ S cm$^{-1}$. In another illustrative embodiment, the present disclosure provides a polyanthracene having an electrical conductivity of about $10^{-9}$ to $10^{-11}$ S cm$^{-1}$. In another illustrative embodiment, the electrical conductivity of the polyanthracene of the present disclosure is about $7 \times 10^{-9}$ to $10^{-11}$ S cm$^{-1}$. Electrical conductivity of the polyanthracene can be measured by dissolving the polyanthracene in a solvent to prepare a solution and measuring the electrical resistance of the solution using a multimeter at room temperature.

In an illustrative embodiment, the present disclosure provides a polyanthracene produced by a method described herein, in which the char yield of the polyanthracene at 1000° C. is not lower than 70%. In another illustrative embodiment, the present disclosure provides a polyanthracene having a char yield at 1000° C. of not lower than 70%. In another illustrative embodiment, the char yield of the polyanthracene of the present disclosure at 1000° C. is not lower than 75%. In another illustrative embodiment, the char yield of the polyanthracene at 1000° C. is not lower than 80%. In another illustrative embodiment, the char yield of the polyanthracene at 1000° C. is not lower than 85%. In another illustrative embodiment, the char yield of the polyanthracene at 1000° C. is from 70% to 95%, from 70% to 90%, from 70% to 85%, or from 70% to 80%. To obtain the char, the polyanthracene is heated at a rate of 20° C. min$^{-1}$ in a chamber with nitrogen flow at a rate of 40 ml min$^{-1}$.

The char yield is calculated as the percentage of the weight of the remaining substance to the initial weight of the polyanthracene.

In an illustrative embodiment, the present disclosure provides a polyanthracene produced by a method described herein, in which the produced polyanthracene is at least partially (or completely) soluble in an organic solvent. In another illustrative embodiment, the present disclosure provides a polyanthracene which is at least partially (or completely) soluble in an organic solvent. In another illustrative embodiment, the polyanthracene of the present disclosure that can be dissolved in the organic solvent is at least 5%, at least 10%, at least 20%, at least 30%, at least 40%, at least 50%, at least 60%, at least 70%, at least 80%, or at least 90% of the total weight of the polyanthracene present in the organic solvent. In another illustrative embodiment, the polyanthracene dissolved in the organic solvent is between 5%-100%, between 5%-90%, between 5%-80%, between 5%-70%, between 5%-60%, between 5%-50%, between 5%-40%, between 5%-30%, between 5%-20%, between 5%-10%, between 10%-100%, between 10%-90%, between 10%-80%, between 10%-70%, between 10%-60%, between 10%-50%, between 10%-40%, between 10%-30%, or between 10%-20% of the total weight of the polyanthracene present in the organic solvent. In another illustrative embodiment, 5%-100% of the polyanthracene by weight is soluble in the organic solvent. Illustrative examples of organic solvents in which the polyanthracene is soluble include, but are not limited to, esters such as ethyl acetate and n-butyl acetate, ketones such as acetone and methyl ethyl ketone, alcohols such as ethanol and isopropanol, ethers such as diethyl ether and dioxane, aliphatic or aromatic hydrocarbons such as toluene and cyclohexane, and any mixture thereof. In another illustrative embodiment, the polyanthracene is at least partially (or completely) soluble in polar organic solvents, including without limitation, N-methylpyrrolidone (NMP), tetrahydrofuran (THF), chloroform, dimethylformamide (DMF), and/or dimethylsulfoxide (DMSO). In another illustrative embodiment, 5%-100% of the polyanthracene by weight is soluble in the organic solvent including, but not limited to one or more of: N-methylpyrrolidone (NMP), tetrahydrofuran (THF), chloroform, dimethylformamide (DMF), and dimethylsulfoxide (DMSO).

In an illustrative embodiment, the present disclosure provides a polyanthracene produced by a method described herein, in which the produced polyanthracene has absorbance peaks at wavelengths ranging from about 380 nm to about 690 nm. In another illustrative embodiment, the present disclosure provides a polyanthracene having absorbance peaks at wavelengths ranging from about 380 nm to about 690 nm. In another illustrative embodiment, the polyanthracene of the present disclosure has absorbance peaks at wavelengths ranging from about 470 nm to about 690 nm. In another illustrative embodiment, the polyanthracene has absorbance peaks at wavelengths ranging from about 600 nm to about 690 nm.

In an illustrative embodiment, the present disclosure provides a composition including a plurality of anthracene monomers and an oxidant. In another illustrative embodiment, the oxidant includes, but is not limited to one or more of: $FeCl_3$, $FeBr_3$, $AlCl_3$, $AlBr_3$, $AlI_3$, $AlRCl_2$, $AlR_2Cl$, $AlR_3$, $CuCl_2$, $CuBr_2$, $MoCl_5$, $SnCl_4$, $SnBr_4$, $SnI_4$, $MgCl_2$, $MgBr_2$, $MgI_2$, $CaCl_2$, $CaBr_2$, $CaI_2$, $ZnCl_2$, $ZnBr_2$, $ZnI_2$, $BF_3$, $TiCl_4$, $TiBr_4$, $SbCl_5$, and any combination thereof. In another illustrative embodiment, the composition further includes a reaction solvent. In another illustrative embodiment, the reaction solvent is nitroalkanes, aromatic nitro compounds, hydrocarbons, halogenated hydrocarbons, and/or nitriles. In another illustrative embodiment, the reaction solvent includes, but is not limited to one or more of: nitromethane, nitroethane, nitrobenzene, dinitrobenzene, hexane, benzene, pentane, isooctane, cyclohexane, dichloromethane, chloroform, dichloroethane, dichlorobenzene, bromoethane, dibromoethane, bromobenzene, dibromobenzene, bromopentane, carbon tetrachloride, acetonitrile, propionitrile, butyronitrile, and any combination thereof. In another illustrative embodiment, the composition further includes water. In another illustrative embodiment, the water constitutes at least 1%, 5%, 10%, 20%, 30%, 40%, or 50% in volume of the composition. In another illustrative embodiment, the water constitutes about 1% to 5%, about 5% to 10%, about 10% to 15%, about 15% to 20%, about 20% to 25%, about 25% to 30%, about 30% to 35%, about 35% to 40%, about 40% to 45%, or about 45% to 50% in volume of the composition.

The polyanthracene of the present disclosure has high thermal stability and ablation resistance. Ablation is an erosive phenomenon in which, as a material is exposed to high temperatures such as above 1200° C., parts of the material are eroded by thermal oxidation. Substances undergoing ablation may be removed by combustion flames with high pressure and velocity. Materials having ablation resistance can have a low erosion rate and long material lifetime even when exposed to high or extremely high temperatures. The resistance to ablation of the polyanthracene product may be tested by an ablation test such as without limitation oxyacetylene ablation testing. For example, in oxyacetylene ablation testing, hot combustion gases (such as oxyacetylene) can be directed along the direction perpendicular to the center of the specimen of polyanthracene until burn-through is achieved. The erosion rate of the polyanthracene can be determined by dividing the original thickness of the specimen by the time required for burn-through (ASTM Standard E 285-80, (2002), "Standard Test Method for Oxyacetylene Ablation Testing of Thermal Insulation Materials," ASTM International, West Conshohocken, Pa., www.astm.org; Najim, T. et al, "Thermal and Ablative Properties of Ipns and Composites of High Ortho Resole Resin and Difurfurylidene Acetone", Leonardo Electronic Journal of Practices and Technologies, 13:34-46 (2008)). Other methods for ablation test may also be used, for example, the polyanthracene product can be exposed to flames that are applied to the product at certain speeds and temperatures for a certain period of time and observe the effects of such flame on the product.

In another aspect, the present disclosure provides a polyanthracene useful for making thermostable materials or ablation resistant materials. The thermal stable materials or ablation resistant materials may be made by any method known to a person skilled in the art. In brief, in an illustrative embodiment, the materials may be made by producing the polyanthracene using the methods described herein, isolating and purifying the resulting polyanthracene, making the polyanthracene into the desired shape and structure such as powder, film, foam, sheet, block, solution and paste. The ablation resistant polyanthracene of the present disclosure may be used as protective surface materials for any surface, such as but not limited to, machinery, construction, buildings and steel structures etc., that may require resistance to fire and extremely high heat.

Furthermore, the polyanthracene described herein can be used as precursor materials for making a variety of carbon materials and composite carbon materials.

The polyanthracene described herein can be used as carbon precursors for the preparation of carbon fibers and carbon fiber-reinforced carbon composite materials. In an illustrative embodiment, carbon fiber is made using the polyanthracene described herein. In brief, the polyanthracene can be drawn into long strands of fibers and then heated to a very high temperature in the absence of oxygen until the fibers are carbonized; the produced carbon fibers can be used to make products such as racing car bodies, golf club shafts, bicycle frames, fishing rods, automobile springs, sailboat masts, and many other products where light weight and high strength are desirable. The polyanthracene described herein may also be used to make nanotubes that can make high-strength fibers, submicroscopic test tubes, and new semiconductor materials for integrated circuits (for review, please see: P. Morgan, Carbon fibers and their composites, published by CRC Press (2005); B. George et al, *Materials Handbook*. Published by McGraw-Hill, 1997; Ebbesen, T. W. "Carbon Nanotubes." *Physics Today,* 26-32 (1996 June)). In another illustrative embodiment, carbon fiber-reinforced carbon composite materials are made using the polyanthracene described herein (for reviews on production method, please see: P. Morgan, Carbon fibers and their composites, published by CRC Press (2005)). The obtained carbon fiber-reinforced carbon composite materials can be used in automotive applications and railway applications, such as components of the brake systems on high performance road cars or on high-speed trains (e.g. brake disc and brake pads).

The polyanthracene described herein has moderate electrical conductivity and thus can be used to conduct electricity. In an illustrative embodiment, the polyanthracene or the doped polyanthracene can be used as an additive in materials that have no or poor electrical conductivity so as to improve the conductivity of the materials. In another illustrative embodiment, the polyanthracene can be used as an additive in materials that tend to accumulate static electricity so as to prevent accumulation of static electricity in such materials. In another illustrative embodiment, the polyanthracene may be used in a packaging material to prevent accumulation of static electricity in the material.

The polyanthracene described herein can have wide applications. For example, they may be used to make an anti-ablation paint, rechargeable battery, ultra-capacitor, and carrier for catalysts (D. Fauteux et al, "Lithium polymer electrolyte rechargeable battery," Electrochimica Acta, 40(13-14): 2185-2190 (1995); A. B. Strong, "Fundamentals of composites manufacturing: materials, methods and applications," published by SME, Edition 2, p 133-136 (2007); M. Stasiak et al, "Polymer Fibers as Carriers for Homogeneous Catalysts," Chemistry—A European Journal, 13(21): p 6150-6156 (2007).). In another aspect, the present disclosure provides anti-ablation paint including the polyanthracene of the present disclosure. In another aspect, the present disclosure provides rechargeable battery including the polyanthracene of the present disclosure. In another aspect, the present disclosure provides ultra-capacitor including the polyanthracene of the present disclosure. In another aspect, the present disclosure provides and carrier for catalysts including the polyanthracene of the present disclosure.

In another aspect, the present disclosure provides polyanthracene useful for making thermal resistant materials or ablation resistant materials. In another aspect, the present disclosure provides thermal resistant materials including the polyanthracene of the present disclosure. In another aspect, the present disclosure provides ablation resistant materials including the polyanthracene of the present disclosure.

In another aspect, the present disclosure provides polyanthracene useful for making carbon precursors for the preparation of carbon fibers and carbon fiber-reinforced carbon composite materials. In another aspect, the present disclosure provides carbon precursors for the preparation of carbon fibers and carbon fiber-reinforced carbon composite including the polyanthracene of the present disclosure.

In another aspect, the present disclosure provides polyanthracene useful for making electrically conductive materials. In another aspect, the present disclosure provides an electrically conductive material including the polyanthracene of the present disclosure.

In another aspect, the present disclosure provides polyanthracene useful for making anti-static electricity materials. In another aspect, the present disclosure provides an anti-static electricity material including the polyanthracene of the present disclosure.

EXAMPLES

The following Examples are set forth to aid in the understanding of the present disclosure, and should not be construed to limit in any way the scope of the invention as defined in the claims which follow thereafter.

Example 1

Preparation of Polyanthracene in the Presence of $FeCl_3$, Nitromethane and Water 800 mg (4.488 mmol) anthracene is dissolved in 30 ml nitromethane. The solution is warmed up to the temperature of 80° C. 2184 mg (13.464 mmol) $FeCl_3$ is dissolved in 30 ml nitromethane and filtered. 0.48 ml water is added to the filtered $FeCl_3$ solution and warmed up to 80° C. The $FeCl_3$ solution is added into the anthracene solution. The mixture is incubated in a water bath at 80° C. for 6 hours with a magnetic bar stirring. The reaction is terminated with the addition of 60 ml 95% ethanol.

The reaction mixture is centrifuged to obtain the sediment. The sediment is washed with water for 2-4 times until no $Fe^{3+}$, $Fe^{2+}$ or $Cl^-$ ion are detected in the wash out. Then the sediment is washed with ethanol for 3-5 times until the wash out show no coloring or only light coloring. To further remove $Fe^{3+}$ or $Fe^{2+}$ contaminants, the resulting polyanthracene is added into 20 ml 1M HCl and the mixture is stirred for a whole day. The mixture is centrifuged to collect the sediment. The sediment is washed with water until the wash out has neutral pH value. Then the resulting polyanthracene is added into 30 ml 0.2M $NH_3$ and the mixture is stirred for a whole day. Then the mixture is centrifuged to obtain the sediment, which is in turn washed with water until the wash out becomes neutral. The washed sediment is dried at 80° C. until the residual product reaches constant weight. The resulting polyanthracene is a dark brown powder. The production yield is 38.1%.

Figure 2:
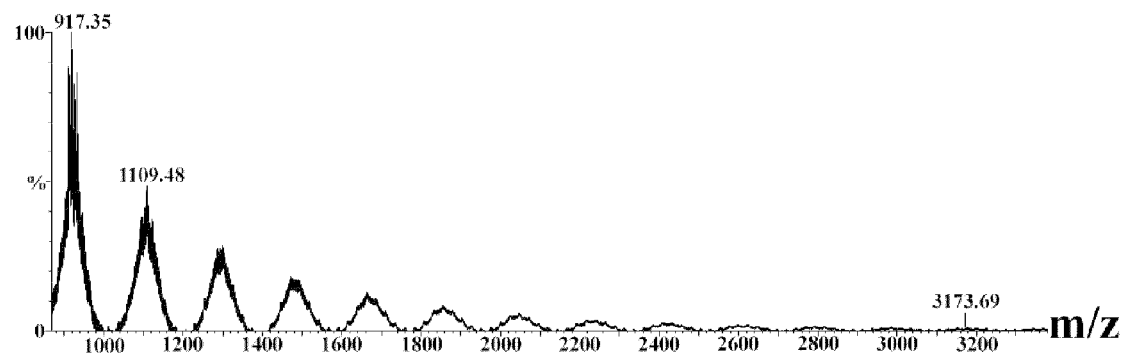
FIG. 2 shows the measurement results indicating the number of monomer units and the molecular weight of polyanthracene produced by the method described in Example 1 of this application.

The polyanthracene is soluble in organic solvents such as NMP (solubility: 27.1 g/l), DMF (solubility: 25.3 g/l), DMSO (solubility: 24.1 g/l), THF (solubility: 26.6 g/l), and $CHCl_3$ (solubility: 24.9 g/l). Its UV-visible spectrum shows strong absorption at the wavelength of about 685 nm. Its electrical conductivity in its virgin salt state is $7.0 \times 10^{-9}$ S cm$^{-1}$, and the electrical conductivity after iodine doping is $7.5 \times 10^{-4}$ S cm$^{-1}$. According to the MALDI-TOF-MS method, the polymerization degree is about 18 units of anthracene monomers, and the molecular weight is about 3200 (FIG. 2). The polyanthracene remain stable after being heated to 350° C. in air. When the polyanthracene is heated from room temperature to 1,000° C. at the rate of 20° C./min in the presence of nitrogen, the thermal decomposition temperature at which the polyanthracene reaches maximum decomposition rate is identified as 530° C., and the residual product is a dark char with metallic luster. The char yield is 81.5% and the electrical conductivity of the char is 51.5 S cm$^{-1}$.

Example 2

Preparation of Polyanthracene in the Presence of $FeCl_3$, Dichloromethane/Nitromethane and Water 800 mg (4.488 mmol) anthracene is dissolved in 30 ml dichloromethane. The solution is warmed up to the temperature of 30° C. 6552 mg (40.392 mmol) $FeCl_3$ is dissolved in 30 ml nitromethane and filtered. 0.72 ml (40.392 mmol) water is added to the filtered $FeCl_3$ solution and warmed up to 30° C. The $FeCl_3$ solution is added into the anthracene solution. The mixture is incubated in a water bath at 30° C. for 6 hours with a magnetic bar stirring. The reaction is terminated with the addition of 60 ml 95% ethanol.

The reaction mixture is centrifuged to obtain the sediment. The sediment is washed with water for 2-4 times until no $Fe^{3+}$, $Fe^{2+}$ or $Cl^-$ ion are detected in the wash out. Then the sediment is washed with ethanol for 3-5 times until the wash out show no coloring or only light coloring. To further remove $Fe^{3+}$ or $Fe^{2+}$ contaminants, the resulting polyanthracene is added into 20 ml 1M HCl and the mixture is stirred for a whole day. The mixture is centrifuged to collect the sediment. The sediment is washed with water until the wash out becomes neutral. Then the resulting polyanthracene is added into 30 ml 0.2M $NH_3$ and the mixture is stirred for a whole day. Then the mixture is centrifuged to obtain the sediment, which is in turn washed with deionized water until the wash out becomes neutral. The washed sediment is dried at 80° C. until the residual product reaches constant weight. The residual product is a dark brown powder. The production yield is 25.0%.

Figure 3:
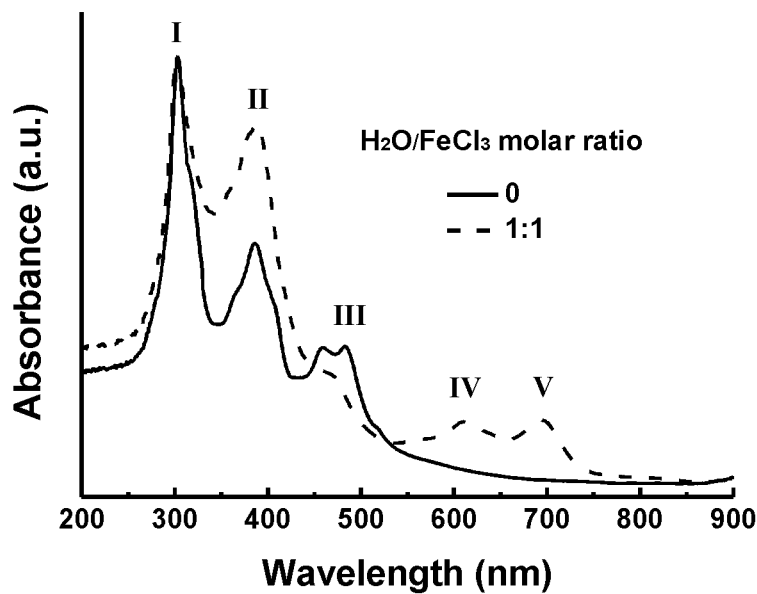
FIG. 3 shows absorption peaks at the wavelengths of 380 nm, 470 nm, 480 nm, 610 nm and 690 nm of polyanthracene produced by the method described in Example 2 of this application.

The polyanthracene is soluble in organic solvents such as NMP (solubility: 25.0 g/l), DMF (solubility: 20.6 g/l), DMSO (solubility: 19.8 g/l), THF (solubility: 23.4 g/l), and $CHCl_3$ (solubility: 23.1 g/l). Its UV-visible spectrum shows stronger absorption at the wavelength of about 380 nm, 470 nm, 480 nm, 610 nm, and 690 nm (FIG. 3). The electrical conductivity of the polyanthracene in its virgin salt state is less than $10^{-11}$ S cm$^{-1}$, and increases to $4.0 \times 10^{-4}$ S cm$^{-1}$ after doping by iodine.

Example 3

Preparation of Polyanthracene in the Presence of $FeCl_3$, Dichloromethane/Nitromethane at the Reaction Temperature of 20° C.

800 mg (4.488 mmol) anthracene is dissolved in 30 ml dichloromethane. The solution is warmed up to the temperature of 20° C. 6552 mg (40.392 mmol) $FeCl_3$ is dissolved in 30 ml nitromethane and filtered. The filtered $FeCl_3$ solution is warmed up to 20° C. in a water bath. The $FeCl_3$ solution is added into the anthracene solution with a magnetic bar stirring. The mixture is incubated in a water bath at 20° C. for 6 hours with a magnetic bar stirring. The reaction is terminated with the addition of 60 ml ethanol.

The reaction mixture is centrifuged to obtain the sediment. The sediment is washed with ethanol to remove any remaining monomer and oligomer. Then the sediment is washed with deionized water for 2-4 times until no $Fe^{3+}$, $Fe^{2+}$ or $Cl^-$ ion is detectable in the wash out with 0.1M NaOH. To further remove any remaining anthracene monomers and low molecular weight polymers, the sediment is washed with ethanol for 3-5 times until the wash out show no coloring or only light coloring. The washed sediment is dried at 80° C. until it reaches constant weight. The resulting polyanthracene is a dark brown powder. The production yield is 66.3%.

Figure 4:
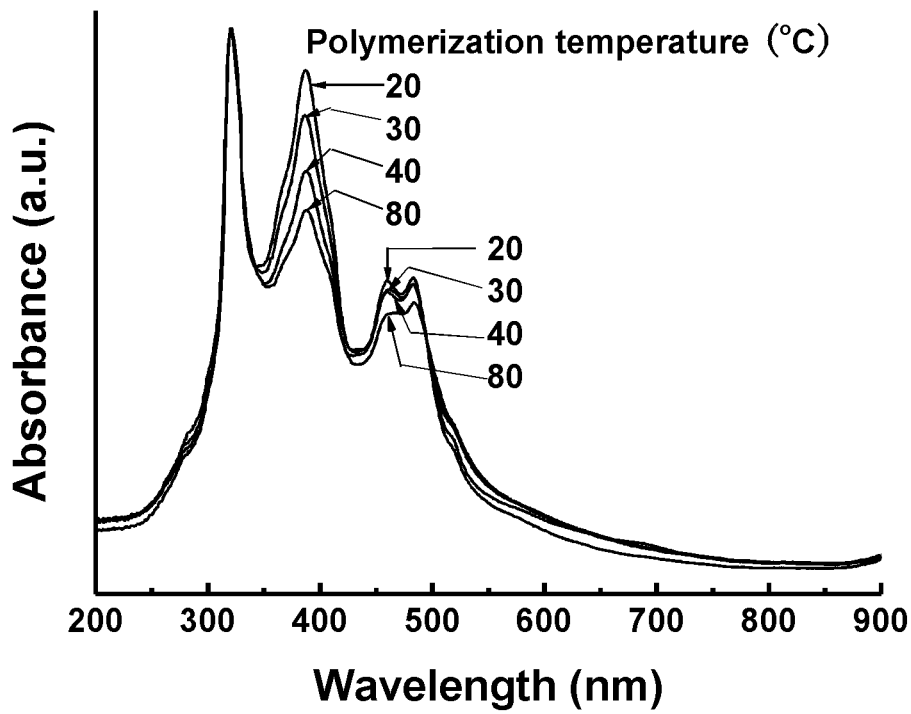
FIG. 4 shows absorption peaks at the wavelengths of 380 nm, 460 nm, and 480 nm of polyanthracene produced by the method described in Examples 3-6 of this application.

The polyanthracene is partially soluble in organic solvents such as NMP (solubility: 17.7 g/l), DMF (solubility: 16.9 g/l), DMSO (solubility: 16.3 g/l), THF (solubility: 17.2 g/l), and $CHCl_3$ (solubility: 15.4 g/l). Its UV-visible spectrum shows stronger absorption at the wavelength of about 380 nm, 460 nm, and 480 nm (FIG. 4). Its electrical conductivity in virgin salt state is about $1.0 \times 10^{-9}$ S cm$^{-1}$, and increases to $2.3 \times 10^{-3}$ S cm$^{-1}$ after doping by iodine. According to the MALDI-TOF-MS measurement, the polymerization degree is about 10, and the molecular weight is about 1722. The polyanthracene remains stable in air at a temperature below 300° C.

Example 4

Preparation of Polyanthracene in the Presence of $FeCl_3$, Dichloromethane/Nitromethane at the Reaction Temperature of 30° C.

800 mg (4.488 mmol) anthracene is dissolved in 30 ml dichloromethane. The solution is warmed up to the temperature of 30° C. 6552 mg (40.392 mmol) $FeCl_3$ is dissolved in 30 ml nitromethane and filtered. The filtered $FeCl_3$ solution is warmed up to 30° C. in a water bath. The $FeCl_3$ solution is added into the anthracene solution with a magnetic bar stirring. The mixture is incubated in a water bath at 30° C. for 6 hours with a magnetic bar stirring. The reaction is terminated with the addition of 60 ml ethanol.

The produced polyanthracene is washed and isolated as described in Example 3. The resulting polyanthracene is a dark brown powder. The production yield is 78.3%.

Figure 5:
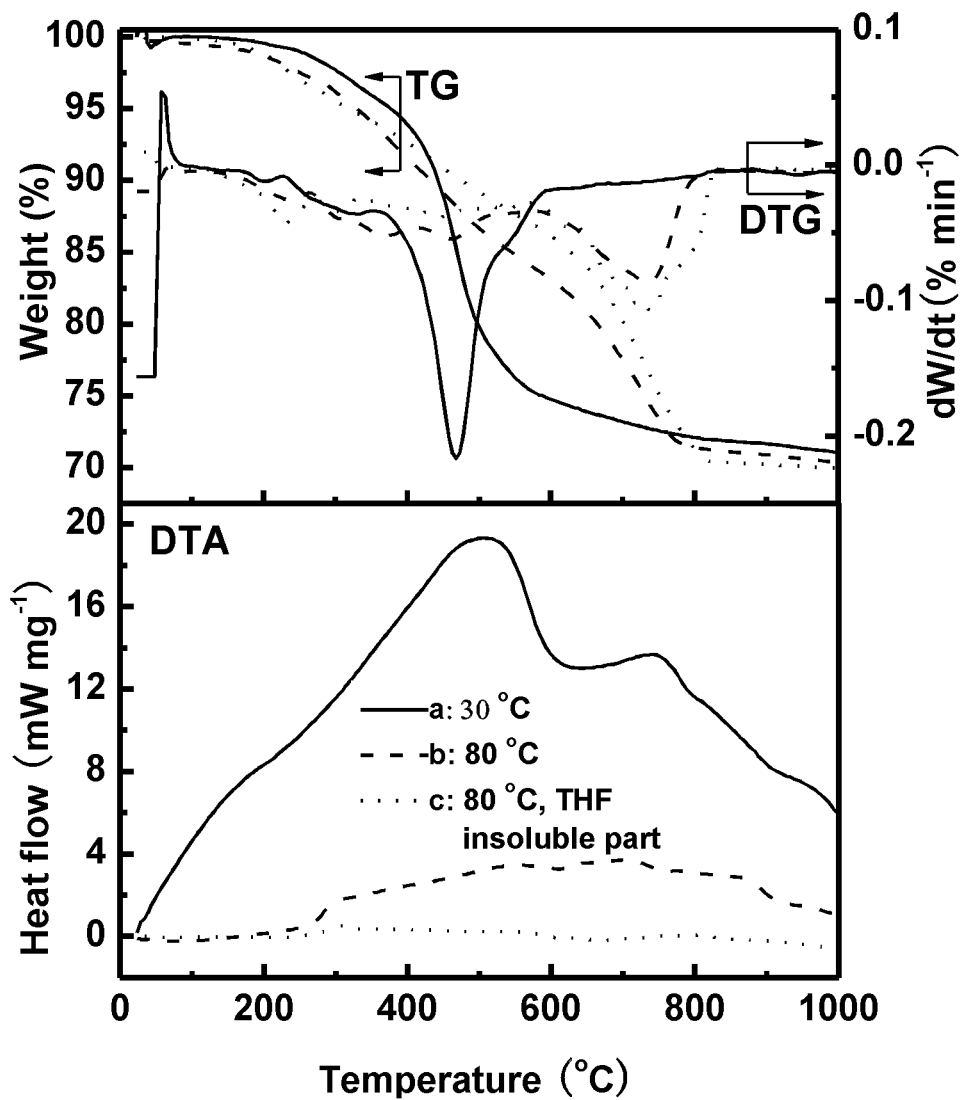
FIG. 5 shows TG (Thermogravimetric Analysis), DTG (Differential Thermogravimetric Analysis) and DTA (Differential Thermal Analysis) of polyanthracene produced by the method described in Examples 4 and 6 of this application. Thermal analysis is conducted in nitrogen atmosphere, at a scanning rate of 20° C./min (a, b) or 10° C./min (c).

The polyanthracene is partially soluble in organic solvents such as NMP (solubility: 14.1 g/l), DMF (solubility: 13.4 g/l), DMSO (solubility: 10.8 g/l), THF (solubility: 11.9 g/l), and $CHCl_3$ (solubility: 9.7 g/l). Its UV-visible light excitation result shows stronger absorption at the wavelength of about 380 nm, 460 nm, and 480 nm (FIG. 4). Its electrical conductivity in virgin salt state is about $5.4 \times 10^{-9}$ S cm$^{-1}$, and increases to $1.1 \times 10^{-2}$ S CM$^{-1}$ after doping by iodine. According to the MALDI-TOF-MS measurement, the polymerization degree is about 7, and the molecular weight is about 1230. The polyanthracene remains stable in air at a temperature below 300° C. When the polyanthracene is heated from room temperature to 1,000° C. at the rate of 20° C./min in the presence of nitrogen, the thermal decomposition temperature is identified as 466° C. (FIG. 5($a$)), and the residual product is a dark bulk-like solid substance. The char yield is 71.1% (FIG. 5($a$)) and the electrical conductivity of the char is 5.8 S cm$^{-1}$.

Example 5

Preparation of Polyanthracene in the Presence of $FeCl_3$, Dichloromethane/Nitromethane at the Reaction Temperature of 40° C.

800 mg (4.488 mmol) anthracene is dissolved in 30 ml dichloromethane. The solution is warmed up to the temperature of 40° C. 6552 mg (40.392 mmol) $FeCl_3$ is dissolved in 30 ml nitromethane and filtered. The filtered $FeCl_3$ solution is warmed up to 40° C. in a water bath. The $FeCl_3$ solution is added into the anthracene solution with a magnetic bar stirring. The mixture is incubated in a water bath at 40° C. for 6 hours with a magnetic bar stirring. The reaction is terminated with the addition of 60 ml ethanol.

The produced polyanthracene is washed and isolated as described in Example 3. The resulting polyanthracene is a brownish black powder. The production yield is 81.8%.

The polyanthracene is partially soluble in organic solvents such as NMP (solubility: 13.8 g/l), DMF (solubility: 13.1 g/l), DMSO (solubility: 10.6 g/l), THF (solubility: 11.7 g/l), and $CHCl_3$ (solubility: 9.4 g/l). Its UV-visible light excitation result shows stronger absorption at the wavelength of about 380 nm, 460 nm, and 480 nm (FIG. 4). Its electrical conductivity in virgin salt state is about $4.1 \times 10^{-11}$ S cm$^{-1}$, and increases to $6.8 \times 10^{-3}$ S cm$^{-1}$ after doping by iodine. According to the MALDI-TOF-MS measurement, the polymerization degree is about 6, and the molecular weight is about 1050. The polyanthracene remains stable in air at a temperature below 300° C.

Example 6

Preparation of Polyanthracene in the Presence of $FeCl_3$, Dichloromethane/Nitromethane at the Reaction Temperature of 80° C.

800 mg (4.488 mmol) anthracene is dissolved in 30 ml dichloromethane at room temperature. 6552 mg (40.392 mmol) $FeCl_3$ is dissolved in 30 ml nitromethane and filtered. The filtered $FeCl_3$ solution is warmed up to 80° C. in a water bath. Then the $FeCl_3$ solution is added in one portion to the anthracene solution, and the mixture is then incubated in the water bath at 80° C. for 6 h with a magnetic bar stirring. The condenser tube is needed to avoid the evaporation of dichloromethane solvent in this circumstance. The reaction is terminated with the addition of 60 ml ethanol.

The produced polyanthracene is washed and isolated as described in Example 3. The resulting polyanthracene is a brownish black powder. The production yield is 94.0%.

The polyanthracene is partially soluble in organic solvents such as NMP (solubility: 12.5 g/l), DMF (solubility: 12.0 g/l), DMSO (solubility: 9.9 g/l), THF (solubility: 10.8 g/l), and CHCl$_3$ (solubility: 9.0 g/l). Its UV-visible light excitation result shows stronger absorption at the wavelength of about 380 nm, 460 nm, and 480 nm (FIG. 4). Its electrical conductivity in virgin salt state is about $2.2 \times 10^{-9}$ S cm$^{-1}$, and increases to $3.6 \times 10^{-4}$ S cm$^{-1}$ after doping by iodine. According to the MALDI-TOF-MS measurement, the polymerization degree is about 8, and the molecular weight is about 1400. The polyanthracene remains stable in air at a temperature below 300° C. When the polyanthracene is heated from room temperature to 1,000° C. at the rate of 20° C./min in the presence of nitrogen, the thermal decomposition temperature is identified as 736° C. (FIG. 5(b)), and the residual product is a dark bulk-like solid substance. The char yield is 70.4% (FIG. 5(b)) and the electrical conductivity of the char is 3.9 S cm$^{-1}$.

100 mg of the polyanthracene produced by the method described in this example is extracted twice with 5 ml THF for 60 min, and the insoluble part is collected by centrifugation and dried at 80° C. in air for 24 h with the yield of about 50%. The obtained polyanthracene is relatively concentrated with polyanthracene molecules of high molecular weight and rigid chain structure compared with those dissolved in THF. When the polyanthracene is heated from room temperature to 1,000° C. at the rate of 10° C./min in the presence of nitrogen, the thermal decomposition temperature is identified as 740° C. (FIG. 5(c)), and the residual product is a dark solid substance with metal luster. The char yield is 70.0% (FIG. 5(c)) and the electrical conductivity of the char is 1166.7 S cm$^{-1}$.

General

With respect to the use of substantially any plural and/or singular terms herein, those having skill in the art can translate from the plural to the singular and/or from the singular to the plural as is appropriate to the context and/or application.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 members refers to groups having 1, 2, or 3 members and so forth.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and products within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A polyanthracene containing 18 or more units of anthracene monomers, wherein the anthracene monomers are represented by formula I

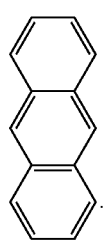

(I)

2. The polyanthracene of claim 1, wherein the polyanthracene contains 19 or more units of anthracene monomers.

3. The polyanthracene of claim 1, wherein the thermal decomposition temperature of the polyanthracene is about 300° C. to 1000° C. in the presence of nitrogen.

4. The polyanthracene of claim 1, wherein the electrical conductivity of the polyanthracene in virgin salt state is from $10^{-9}$ to $10^{-11}$ S cm$^{-1}$.

5. The polyanthracene of claim 1, wherein the electrical conductivity of the polyanthracene in virgin salt state is from about $7\times10^{-9}$ to $10^{-11}$ S cm$^{-1}$.

6. The polyanthracene of claim 1, wherein the char yield of the polyanthracene at 1000° C. is from 70% to 95%.

7. The polyanthracene of claim 1, wherein the polyanthracene is at least partially soluble in an organic solvent.

8. The polyanthracene of claim 7, wherein the organic solvent is selected from the group consisting of N-methylpyrrolidone (NMP), tetrahydrofuran (THF), chloroform, dimethylformamide (DMF), and dimethylsulfoxide (DMSO).

9. A composition comprising at least one polyanthracene, wherein the at least one polyanthracene contains 18 or more units of anthracene monomers, wherein about 5% to 80% of the at least one polyanthracene by weight contains 18 or more units of anthracene monomers, wherein the anthracene monomers are represented by formula I

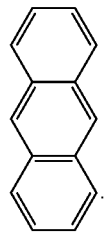

(I)

10. The composition of claim 9, wherein the weight average molecular weight of the at least one polyanthracene is no less than 3000.

11. The composition of claim 9, wherein about 20% to 30% of the at least one polyanthracene by weight contains 18 or more units of anthracene monomers.

12. The composition of claim 9, wherein the thermal decomposition temperature of the at least one polyanthracene is about 300° C. to 1000° C. in the presence of nitrogen.

13. The composition of claim 9, wherein the thermal decomposition temperature of the at least one polyanthracene is 400° C. or higher in the presence of nitrogen.

14. The composition of claim 9, wherein the electrical conductivity of the at least one polyanthracene in virgin salt state is from $10^{-9}$ to $10^{-11}$ S cm$^{-1}$.

15. The composition of claim 9, wherein the char yield of the at least one polyanthracene at 1000° C. is from 70% to 95%.

16. The composition of claim 9, wherein 5% to 100% of the at least one polyanthracene by weight is soluble in an organic solvent.

17. The composition of claim 16, wherein the organic solvent is N-methylpyrrolidone (NMP), tetrahydrofuran (THF), chloroform, dimethylformamide (DMF), dimethylsulfoxide (DMSO), or any combination thereof.

18. The composition of claim 9, wherein the at least one polyanthracene has at least one absorbance peak from about 380 nm to about 690 nm.

19. The composition of claim 9, wherein the composition is a thermal resistant material, an ablation resistant material, a carbon precursor, an electrically conductive material, an anti-static electricity material, an anti-ablation paint, a rechargeable battery, an ultra-capacitor, a carrier for catalysts, or any combination thereof.

* * * * *

UNITED STATES PATENT AND TRADEMARK OFFICE
CERTIFICATE OF CORRECTION

PATENT NO. : 9,290,610 B2
APPLICATION NO. : 14/255715
DATED : March 22, 2016
INVENTOR(S) : Huang et al.

It is certified that error appears in the above-identified patent and that said Letters Patent is hereby corrected as shown below:

Specification

In Column 1, Line 8, delete "§121" and insert -- § 121 --, therefor.

In Column 1, Line 10, delete "§371" and insert -- § 371 --, therefor.

In Column 3, Line 16, delete "CH3" and insert -- $CH_3$ --, therefor.

In Column 3, Line 18, delete "–C=N" and insert -- –C≡N --, therefor.

In Column 3, Line 22, delete "(CH3NO2), nitroethane (CH3CH2NO2)," and insert -- ($CH_3NO_2$), nitroethane ($CH_3CH_2NO_2$), --, therefor.

In Column 3, Line 23, delete "hexane" and insert -- hexane, --, therefor.

Signed and Sealed this
Fourteenth Day of June, 2016

Michelle K. Lee
*Director of the United States Patent and Trademark Office*